(12) United States Patent
Prevoir et al.

(10) Patent No.: US 10,158,933 B2
(45) Date of Patent: Dec. 18, 2018

(54) CUSTOM-MOLDING IN-EAR HEADPHONE EAR TIPS

(71) Applicant: Bose Corporation, Framingham, MA (US)

(72) Inventors: Shawn J. Prevoir, Northborough, MA (US); Shaun Michael Pelkey, Barre, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 15/492,726

(22) Filed: Apr. 20, 2017

(65) Prior Publication Data
US 2017/0311069 A1   Oct. 26, 2017

Related U.S. Application Data

(60) Provisional application No. 62/325,703, filed on Apr. 21, 2016.

(51) Int. Cl.
| | |
|---|---|
| *H04R 1/10* | (2006.01) |
| *B29C 35/08* | (2006.01) |
| *B29C 35/12* | (2006.01) |
| *B29K 683/00* | (2006.01) |
| *B29L 31/34* | (2006.01) |
| *H04R 5/033* | (2006.01) |
| *H04R 25/00* | (2006.01) |

(52) U.S. Cl.
CPC ....... *H04R 1/1016* (2013.01); *B29C 35/0805* (2013.01); *B29C 35/12* (2013.01); *H04R 1/1058* (2013.01); *H04R 1/1091* (2013.01); *B29C 2035/0827* (2013.01); *B29K 2683/00* (2013.01); *B29L 2031/3431* (2013.01); *H04R 5/0335* (2013.01); *H04R 25/652* (2013.01); *H04R 2225/77* (2013.01); *H04R 2460/17* (2013.01)

(58) Field of Classification Search
CPC .. H04R 1/1016; H04R 1/1058; H04R 1/1091; B29C 35/12; B29C 35/0805; B29C 2035/0827
USPC ......... 381/380, 382; 264/255; 181/129, 130, 181/135
See application file for complete search history.

(56) References Cited

U.S. PATENT DOCUMENTS

| | | | |
|---|---|---|---|
| 5,591,199 A | 1/1997 | Porter et al. | |
| 2008/0033071 A1* | 2/2008 | Irmer | C08L 83/04 522/66 |
| 2013/0131519 A1* | 5/2013 | LeBoeuf | A61B 5/0077 600/476 |

(Continued)

FOREIGN PATENT DOCUMENTS

| | | |
|---|---|---|
| EP | 2833650 A1 | 2/2015 |
| WO | 2011097229 A2 | 8/2011 |
| WO | 2015179975 A1 | 12/2015 |

OTHER PUBLICATIONS

Invitation to Pay Additional Fees dated Jun. 16, 2017 for International application No. PCT/US2017/028748.

(Continued)

*Primary Examiner* — Sunita Joshi (57) ABSTRACT

An ear tip for use with an earphone is filled with a UV-curable polymer or other material that hardens when energy is applied, fitted to a user's ear, and exposed to UV light or other appropriate energy, curing or otherwise hardening the material and forming a custom-fit ear tip.

20 Claims, 11 Drawing Sheets

(56) References Cited

U.S. PATENT DOCUMENTS

2016/0317352 A1  11/2016  Blumer et al.

OTHER PUBLICATIONS

International Search Report and Written Opinion dated Aug. 2, 2017 for International application No. PCT/US2017/028748.

* cited by examiner

CUSTOM-MOLDING IN-EAR HEADPHONE EAR TIPS

PRIORITY CLAIM

This application claims priority to U.S. Provisional Patent Application 62/325,703, filed Apr. 21, 2016, the entire contents of which are incorporated here by reference.

BACKGROUND

This disclosure relates to custom-molding in-ear headphone ear tips, and in particular, to using UV-cured elastomer to form an ear tip.

In-ear headphones often include an interface to the ear called an ear tip. The ear tips are generally either a universal design, providing one or more sizes for a user to choose from, possibly made of a compliant material that will partially conform to users' ears, or they are custom molded. Custom-molded ear tips offer the potential advantage of providing a better seal, more reliable fit, and increased comfort. They may fit deeper into the ear canal than a universal tip design, providing improved audio quality, seal, and retention. In addition to earphones, custom-molded ear tips are also generally used for hearing aids.

Custom-molded ear tips tend to be made of hard plastic, which can actually result in decreased comfort if the shape of the ear varies from when the ear tip was molded, due, for example, to motion, activity, heat, sweat, or age (especially for a young user who will grow during the time the ear tip is in use). Forming a custom-molded ear tip generally involves multiple steps: first, a temporarily-liquid material is placed into the ear (or a semi-liquid material or liquid in a compliant container is inserted), and allowed to solidify to the shape of the ear (i.e., by cooling or curing in place). This positive mold then removed and used to form a negative mold corresponding to the ear itself, which is in turn used to form the actual earpiece. This process is generally carried out by a skilled technician or, especially for fitting hearing aids, an audiologist, and may have a turnaround time of one day or longer.

U.S. Patent application publication 2016/0317352 describes using a photo-curable polymer to mold an ear tip in-situ.

SUMMARY

In general, in one aspect, an earphone ear tip includes an inner wall forming a hollow passage, an outer wall joined to the inner wall at a first end and spaced apart from the inner wall along a length between the first end and a second end to define a volume, the outer wall formed of a compliant material and shaped to fit into a portion of a typical human outer ear or ear canal, an end wall closing an otherwise-open space between the inner wall and the outer wall at the second end, the end wall closing the volume, and a compliant material located in the volume between the inner wall, outer wall, and end wall, and a source of applied energy that when activated causes the compliant material to harden.

Implementations may include one or more of the following, in any combination. An earphone may be configured to mate with the ear tip, the source of applied energy including a light-emitting diode (LED) located in the earphone. The LED may be directly coupled to the inner wall of the ear tip. A sensor may be positioned to detect light emitted by the LED and reflected by skin adjacent to the ear tip when the ear tip may be located in an ear. The LED may be coupled to the polymer by a fiber-optic cable. The earphone may include audio electronics acoustically coupled to the hollow passage. The earphone may fit within the hollow passage. The outer wall may be shaped to close the entrance to a user's ear canal without protruding into the ear canal. The applied energy may be ultra violet (UV) light. The compliant material may include UV-curable silicone. The outer wall may include a material that blocks the transmission of UV light. The applied energy may include a magnetic field, and the compliant material may include a ferrofluid.

In general, in one aspect, a method of molding a custom ear tip includes inserting an ear tip partially into an ear canal of a person. The ear tip includes an inner wall forming a hollow passage, an outer wall joined to the inner wall at a first end and spaced apart from the inner wall along a length between the first end and a second end to define a volume, the outer wall formed of a compliant material and shaped to fit into the ear canal, and a compliant material that hardens when exposed to an external source of energy located in the volume between the inner wall and outer wall. Energy is applied to the compliant material for an amount of time required for the compliant material to harden.

In general, in one aspect, an earphone ear tip includes an inner wall forming a hollow passage, and an outer wall joined to the inner wall at a first end and spaced apart from the inner wall along a length between the first end and a second end to define a volume. The outer wall is formed of a compliant material and shaped to fit into a portion of a typical human outer ear or ear canal. An end wall closes an otherwise-open space between the inner wall and the outer wall at the second end, the end wall closing the volume. A compliant material is located in the volume between the inner wall, outer wall, and end wall. An earphone is configured to mate with the ear tip and includes a light source that when activated causes the compliant material to harden. A sensor in the earphone is positioned to detect light emitted by the light source and reflected by skin adjacent to the ear tip when the ear tip is located in an ear.

Implementations may include one or more of the following, in any combination. The light source may be directly coupled to the inner wall of the ear tip. The light source may be coupled to the polymer by a fiber-optic cable. The earphone may includes audio electronics acoustically coupled to the hollow passage. The earphone may fit within the hollow passage. The outer wall may be shaped to close the entrance to a user's ear canal without protruding into the ear canal. The light source may emits ultra violet (UV) light. The compliant material may include UV-curable silicone. The outer wall may include a material that blocks the transmission of UV light. The light source may selectively emit a second wavelength of light other than UV, which the sensor detects. The light source may include a first LED that emits UV light and a second LED that emits light of the second wavelength.

In general, in one aspect, an earphone ear tip includes an inner wall forming a hollow passage, and an outer wall joined to the inner wall at a first end and spaced apart from the inner wall along a length between the first end and a second end to define a volume. The outer wall is formed of a compliant material and shaped to fit into a portion of a typical human outer ear or ear canal. An end wall closes an otherwise-open space between the inner wall and the outer wall at the second end, the end wall closing the volume. A variable-stiffness material is located in the volume between the inner wall, outer wall, and end wall. A source of energy selectively and repeatably causes the variable-stiffness material to become soft or hard.

Implementations may include one or more of the following, in any combination. The variable-stiffness material may include a photo-reactive material, and the source of energy may include a light source that emits light of a first wavelength that causes the photo-reactive material to harden, and emits light of a second wavelength that causes the photo-reactive material to become compliant. The light source may include a first LED that emits light of the first wavelength and a second LED that emits light of the second wavelength. The variable-stiffness material may soften when current is applied and harden when current is removed, the source of energy including a source of current. The current may cause Joule heating of the variable-stiffness material.

In general, in one aspect, an earphone ear tip includes an inner wall forming a hollow passage, and an outer wall joined to the inner wall at a first end and spaced apart from the inner wall by an increasing distance along a length between the first end and a second end to define a generally cone-shaped volume. The outer wall is formed of a compliant material and shaped to fit into an entrance of a typical human ear canal. An end wall closes an otherwise-open space between the inner wall and the outer wall at the second end, the end wall closing the volume. A variable-stiffness material is located in the volume between the inner wall, outer wall, and end wall. A first source of applied energy, when activated, causes the compliant material to change between a compliant state and a stiff state.

Implementations may include one or more of the following, in any combination. The first source of applied energy may cause the variable-stiffness material to become stiff, the apparatus including a second source of applied energy that when activated causes the variable-stiffness material to return to its compliant state. The variable-stiffness material may include a photo-reactive material, the first source of energy including a light source that emits light of a first wavelength that causes the photo-reactive material to become stiff, and emits light of a second wavelength that causes the photo-reactive material to become compliant. When the first source of applied energy is activated, the variable-stiffness material may become compliant, and when the first source of applied energy is deactivated, the variable-stiffness material returns to a stiff state.

In general, in one aspect, an earphone ear tip includes a positioning and retaining structure for positioning and retaining the earphone in the outer ear of a wearer. The positioning and retaining structure includes a variable-stiffness material. A source of energy selectively and repeatably causes the variable-stiffness material to become soft or hard.

Implementations may include one or more of the following, in any combination. The variable-stiffness material may include a photo-reactive material, and the source of energy may include a light source that emits light of a first wavelength that causes the photo-reactive material to harden, and emits light of a second wavelength that causes the photo-reactive material to become compliant, with a light-conductive pathway that conducts the light emitted by the source and releases it into the positioning and retaining structure along its length. The variable-stiffness material may softens when current is applied and harden when current is removed, the source of energy including a source of current and a conductor that routes the current along a length of the positioning and retaining structure. The current in the conductor may causes Joule heating of the variable-stiffness material.

Advantages include providing a custom-fit ear tip without the time, inconvenience, and expense of prior solutions. Cost may also be reduced, as fewer total ear tips need to be included with a product, as compared to non-custom tip designs.

All examples and features mentioned above can be combined in any technically possible way. Other features and advantages will be apparent from the description and the claims.

DESCRIPTION

Currently, methods to form custom ear tips can be time consuming, costly, and unpleasant for the end user. This disclosure details a method to provide a simple, custom, do-it-yourself ear tip using a polymeric skin filled with an ultraviolet-(UV) curable elastomer, such as a UV-curable silicone. One example is Silopren™ UV Electro 225-1 UV-curing liquid silicone rubber (LSR) from Momentive Performance Materials. UV curable elastomers cure very rapidly and "on demand," meaning that they can be pre-mixed, shielded from ambient light for prolonged periods of time (i.e., sitting on a store shelf), then hardened when required. Unlike moisture-cured silicones, which emit acetic acid as a byproduct during curing, these UV curable materials do not emit byproducts, including heat. Rapid curing without emitted byproducts is advantageous for in-ear curing, especially when the tip is meant to conform to the ear canal. Such materials are available with post-cure hardnesses down to as low as 10 Shore A, making them well-suited for use in earphone ear tips.

Figure 1A:
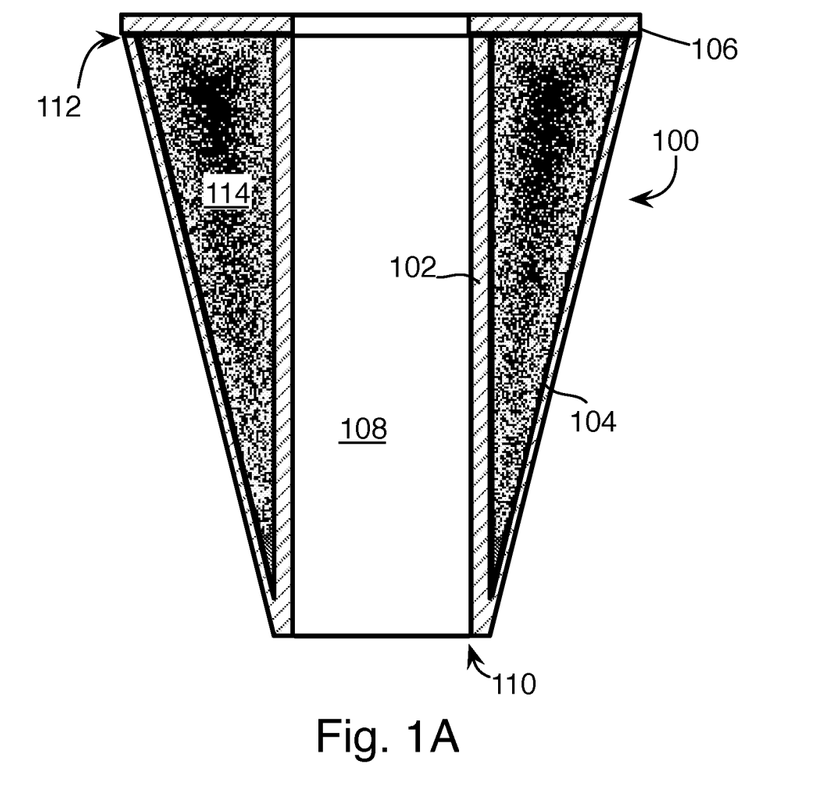
FIG. 1A shows a cross-sectional view of an ear tip.
Figure 1B:
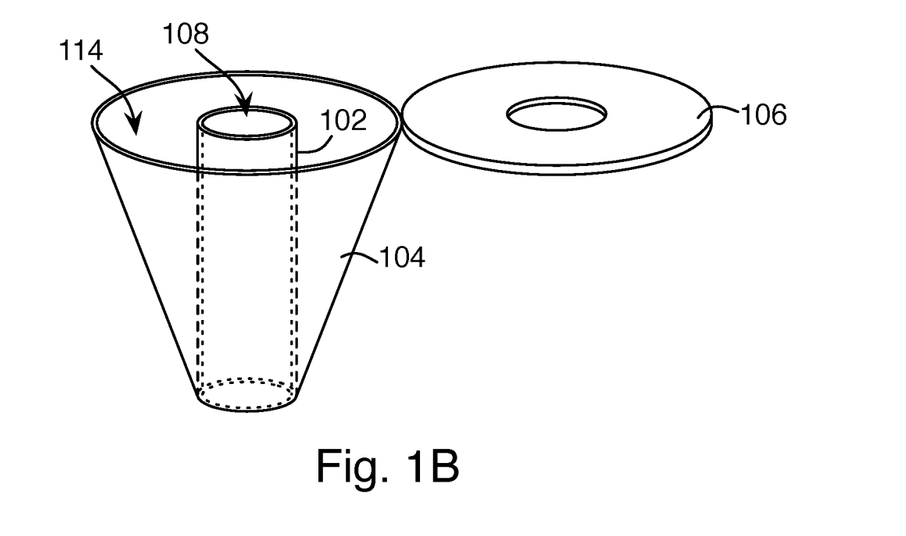
FIG. 1B shows an isometric view of the ear tip of FIG. 1A.

As shown in FIGS. 1A and 1B, a preform ear tip 100 has an inner wall 102, an outer wall 104, and an end cap 106. The inner wall provides a hollow passage 108 through which audio will ultimately pass, or into which electronics will be placed. The outer wall is connected to the inner wall at a first end 110, and tapers away from the inner wall towards a second end 112. The end cap closes the space between the inner and outer walls at the second end, closing a volume 114 between the walls and end cap. That volume is filled with a UV-curing polymer. In some examples, the end cap 106 may be an integral part of the outer wall 104, attached at one point along the circumference of the opening 112, to be folded over the opening to close it. FIG. 1B shows this design, with the end cap open and the volume not yet filled. In other examples, the end cap may be an entirely separate part. The design shown is radially symmetric, but will not remain symmetric once molded to the ear. Markings or alignment guides may be used to make sure that the correct orientation is maintained when the ear tip is in use. In some examples, the tip design is asymmetric to begin with and only fits into the ear if oriented correctly, even before curing.

In some examples, the preform 100 is formed with the volume 114 already closed, and the polymer is injected through a hole that preexists or is pierced through the end cap. In other examples, the end cap is initially positioned to leave the second end open, the polymer is placed in the volume, and the end cap is then placed over the opening and sealed to the inner and outer walls, such as by glue or plastic welding. The outer wall may be formed of a material that is opaque to UV radiation. This has two purposes—increasing the shelf-life of the ear tip pre-curing, by minimizing environmental exposure to UV light, and minimizing exposure of the user's skin to the UV light used to cure the polymer.

Figure 2:
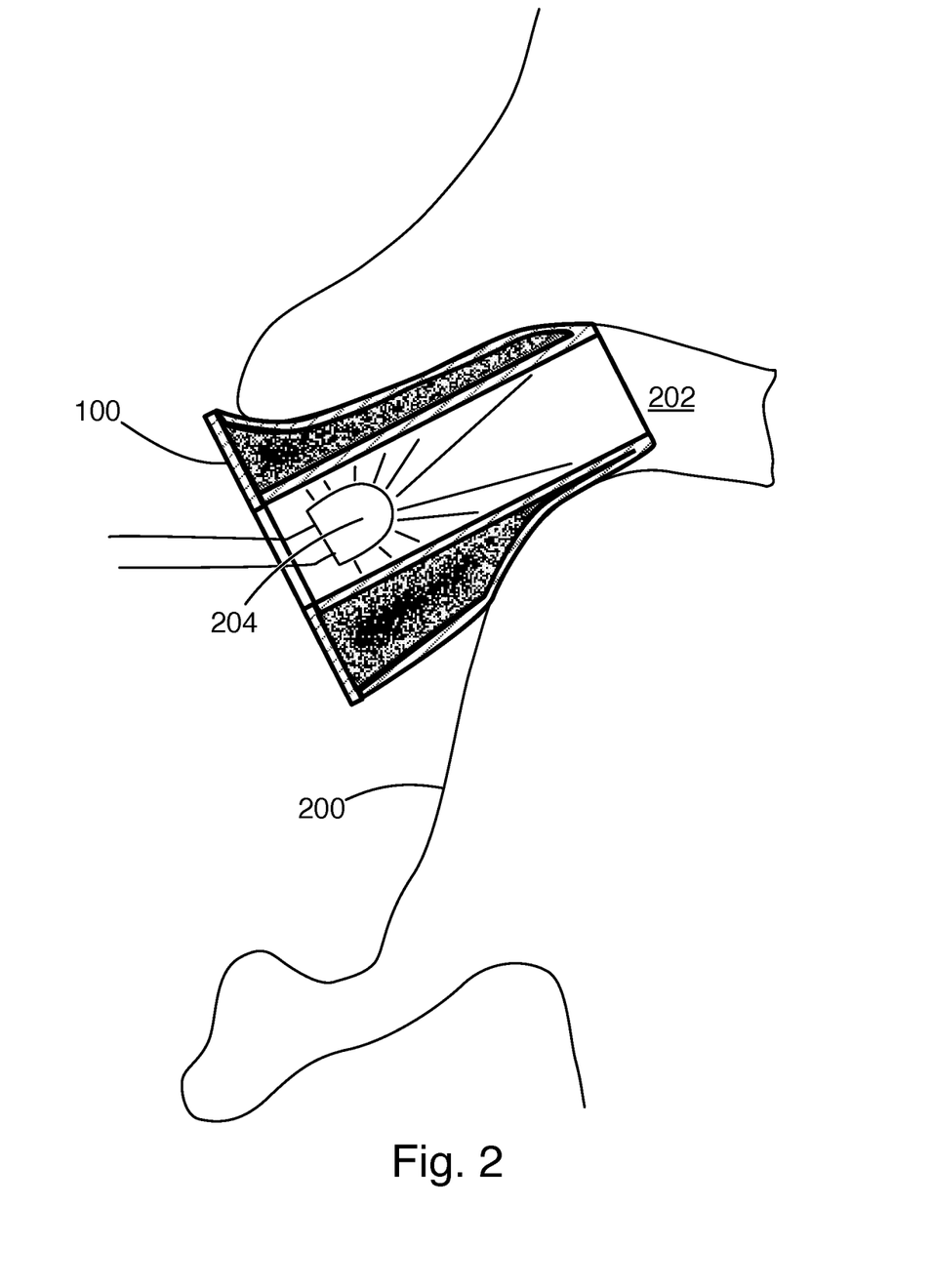
FIGS. 2 through 5 show embodiments of the ear tip of FIGS. 1A and 1B in an ear, in cross-section.

In use, as shown in FIG. 2, the user inserts the soft preform ear tip 100 into the outer ear 200, and possibly into the ear canal 202. Inserting the preform ear tip into the ear deforms it, as the outer wall bends to match the shape of the ear, and the liquid polymer moves around to fit. The user then activates a UV light source 206, such as an LED. The user waits a few minutes while the preform cures into the shape of the outer ear and ear canal. At this point, the ear tip is cured and can be used to couple an earphone to the ear. The example of FIG. 2 shows the UV LED simply placed into the hollow space formed by the inner wall, such that it will be removed and replaced by the earphone.

Figure 3:
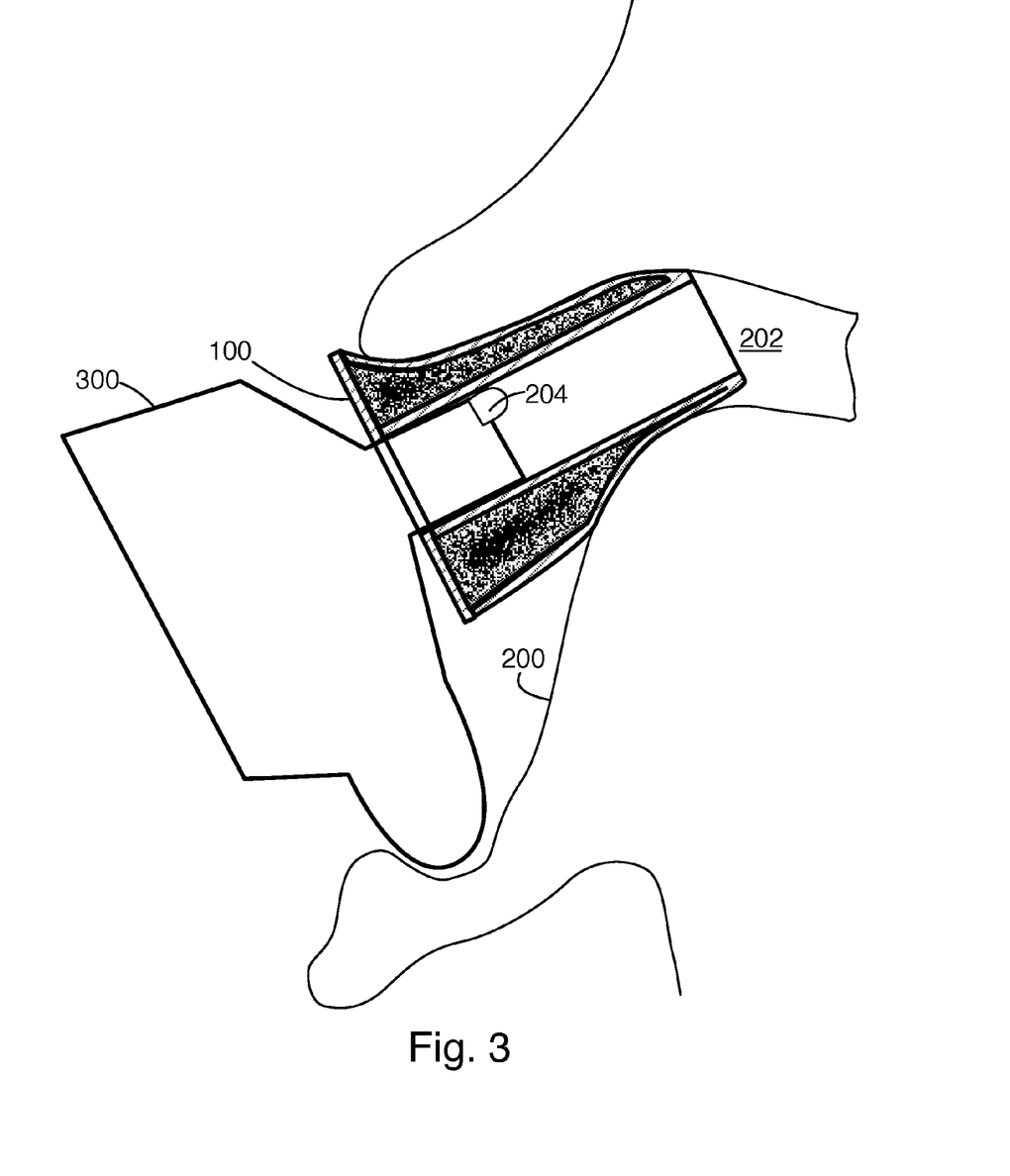
Figure 4:
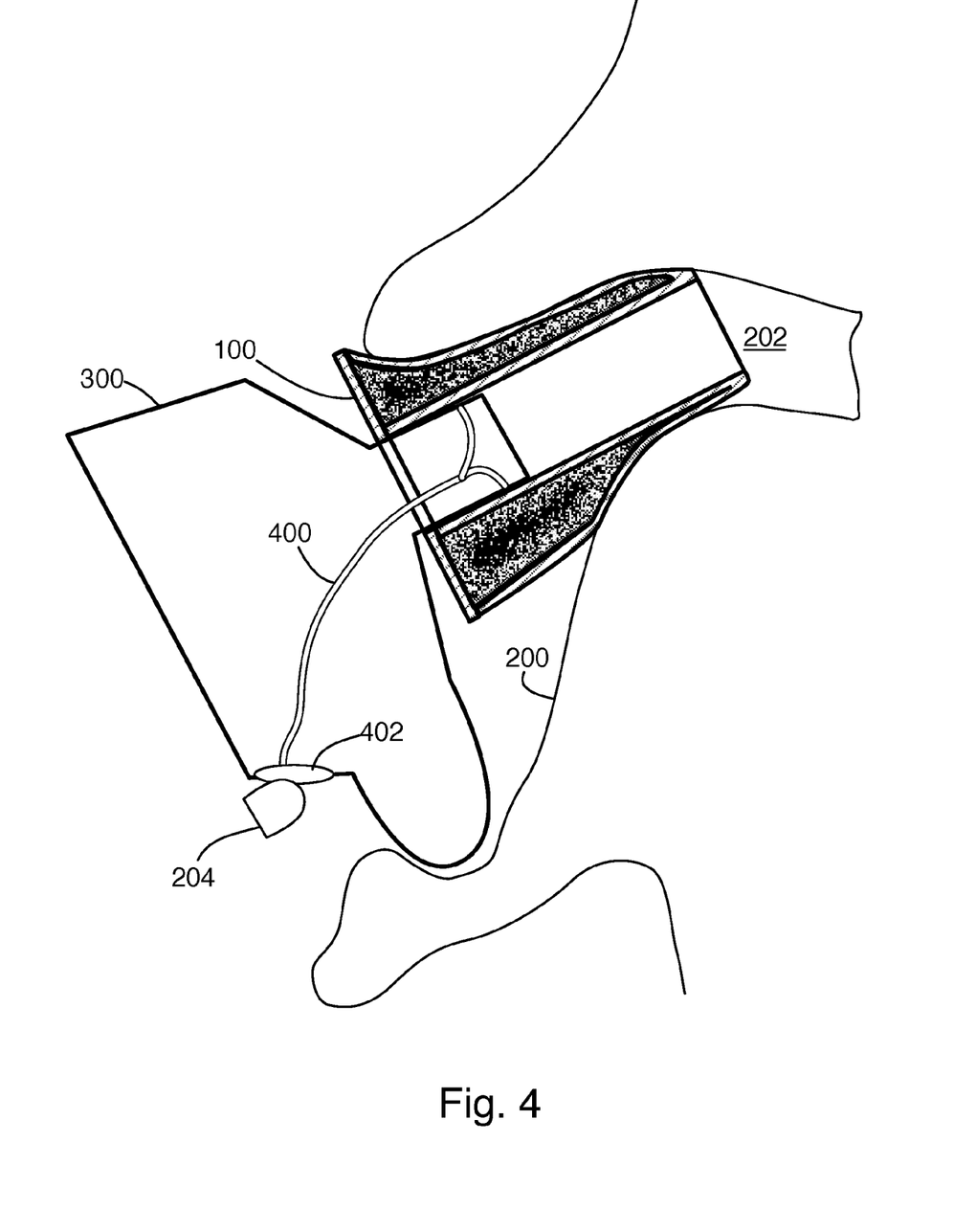

In other examples, as shown in FIGS. 3 and 4, the ear tip is cured with the earphone (only shown as an outline) already in place. This may have the advantage of assuring that the ear tip will not deform, before curing, into a configuration that would not allow the earphone to be attached. In the example of FIG. 3, the UV LED is integrated into the earphone 300, or located externally with a fiber optic cable through the earphone leading into the ear tip, or some combination of these, such that it is not removed after curing. This design may be advantageous where the LED serves other purposes after curing, such as in a sensor application to measure some biometric of the user, or as a user interface indicator, possibly in combination with a phosphor layer that will emit visible light when energized by the UV light. In some cases, a window may be provided in the outer layer that allows UV or other frequencies of light to pass for sensor or indicator applications, such as described in U.S. patent application Ser. Nos. 14/724,459 and 14/812,672, incorporated here by reference. The window may be a physical opening or a region where the material has different optical properties.

Figure 5:
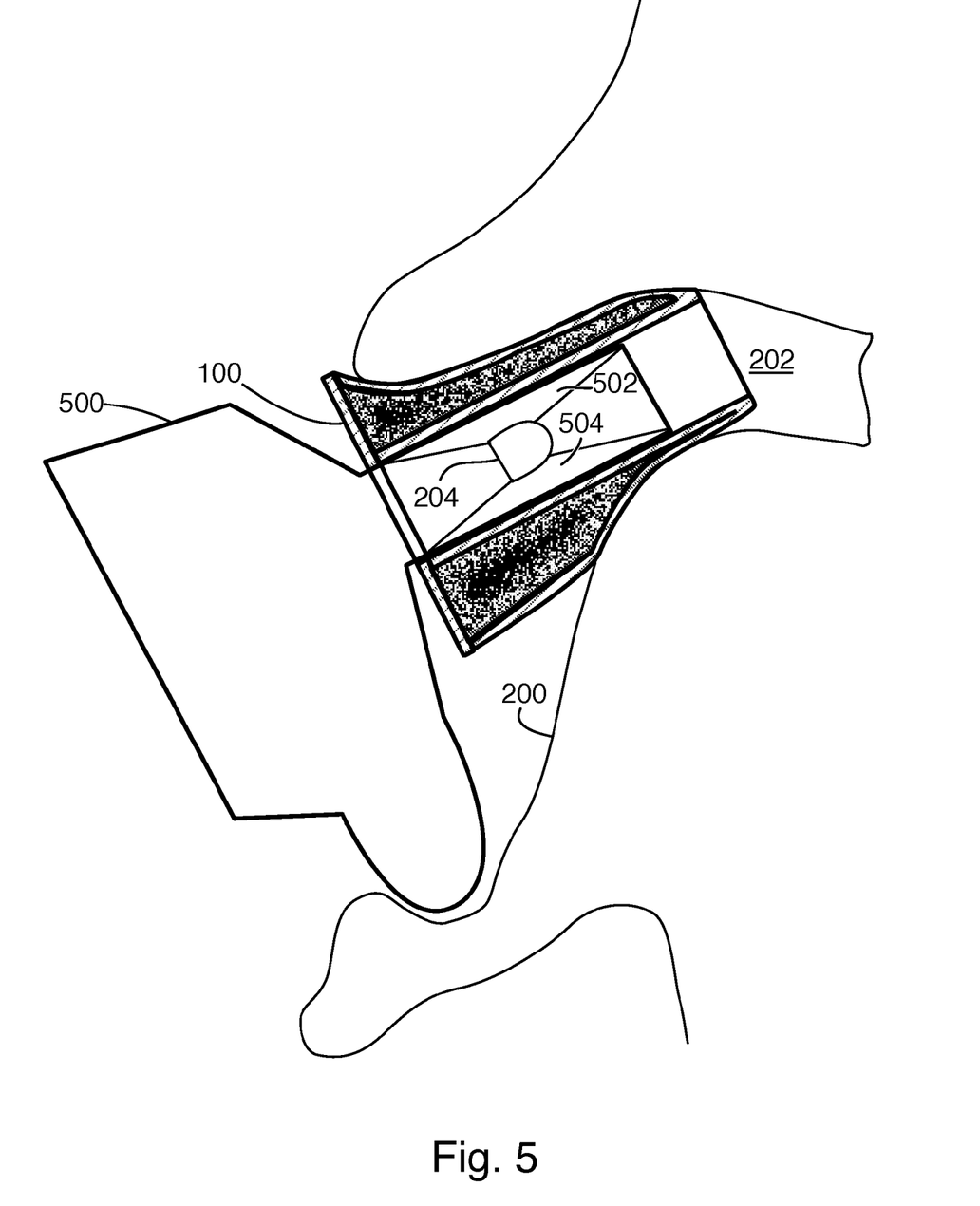

In the example of FIG. 4, the UV light source 204 is external to the earphone 300, and is coupled to the ear tip 100 by a fiber-optic cable 400. The cable may be removed after the curing process, or it may be left in place. In some examples, the fiber optic cable ends in a coupling window at an outer surface of the earphone, such that the UV light source is pressed against the coupling window 402 to deliver UV light to the fiber. In yet another example, as shown in FIG. 5, the UV light 204 is located in a dummy earphone 500 that provides the structural shape of the earphone, but provides better coupling of the UV light to the entire ear tip, such as by locating light guides 502, 504 in an extended nozzle section. The dummy earphone is replaced by the actual earphone after the ear tip is cured. In the examples where the UV light source is not needed after the ear tip is cured, what to do with it is likely a business decision—it could be discarded, it could be subject to a deposit or rebate to encourage its return to the vendor, or it could be retained by the vendor, with the ear tips being fitted at the time of sale (though this loses some of the advantages of the invention, it still provides immediate delivery and low cost). In other examples, the UV light source may be retained by the user for entirely different purposes.

Figure 6:
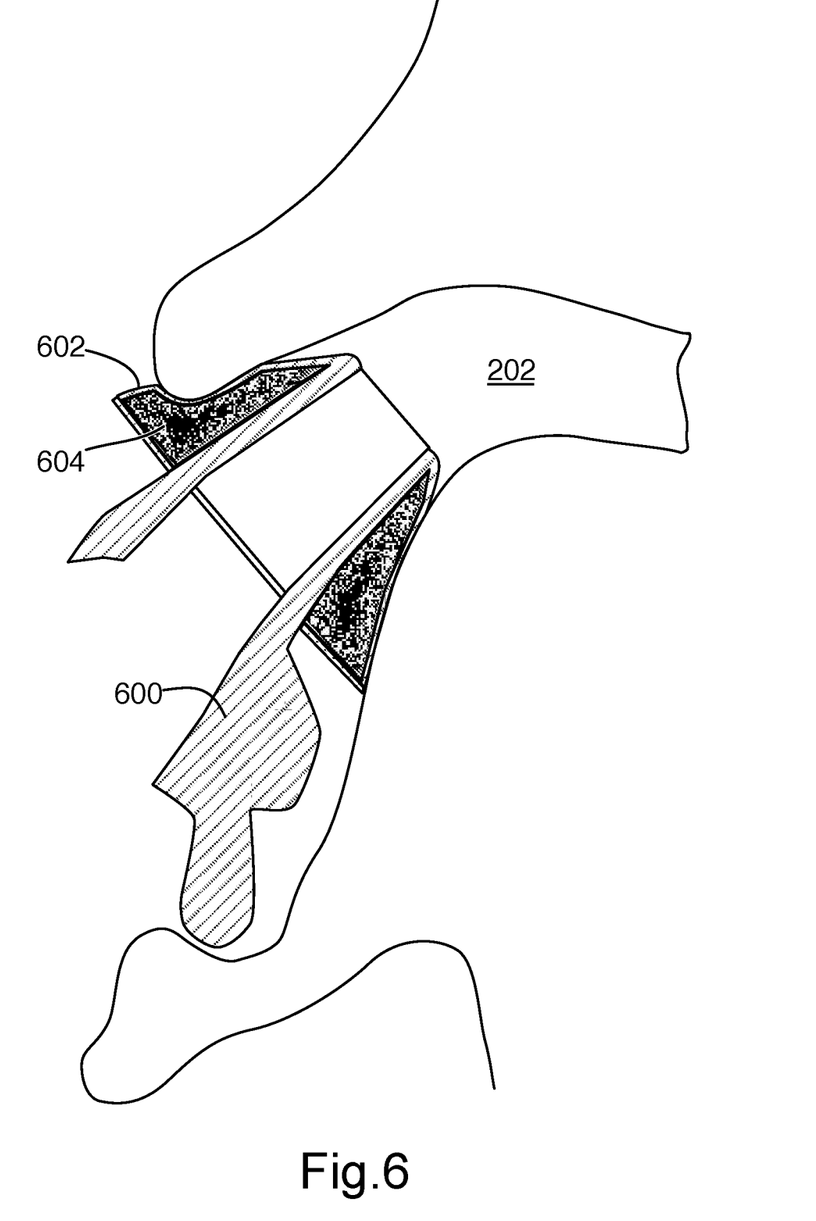
FIG. 6 shows another embodiment of an ear tip in an ear, in cross-section.

An example application that improves the acoustic seal of the ear tip without protruding into the ear canal is shown in FIG. 6. In this example, the StayHear+® eartip 600 from Bose Corporation of Framingham, Mass. is used. As described in U.S. Pat. No. 8,737,669, an umbrella-shaped shroud 602 around the nozzle of the earpiece is located just at the entrance to the ear canal 202, sealing the ear without entering the canal. In its standard configuration, three sizes of the ear tip are provided to customers, and most users can find one that seals the canal entrance without being uncomfortable, but some find one size to be too large and the next size down to be too small. In the example of FIG. 6, the space underneath the shroud is filled with UV-curable elastomer 604, and cured as described above. In this way, the shroud is molded to the particular shape of the user's ear. By replacing the original shroud with a thinner, more-compliant material, a larger size than would otherwise comfortably fit the user may be used. After curing, the stiffness is increased, which maintains the seal without reintroducing the pressure that resulted from the deformation of the stiffer, non-custom version to fit the ear.

In all of the above examples, it is possible that the preform ear tip is inserted into the ear before it is filled with the UV-curable polymer, which is then injected into the pre-sealed or un-sealed void and immediately cured. This may avoid the need to seal the injection site prior to curing, or to cap the space between the inner and outer walls at all. Injecting the polymer after the ear tip is in the ear may also avoid excess amounts of the polymer preventing the ear tip from properly fitting the ear prior to curing.

In other examples, a material other than UV-curable polymer may be used, which may provide additional use cases. Rheologically-complex materials, such as a ferrofluid, may be temporarily hardened by an applied electric or magnetic field. An ear tip incorporating such a fluid as otherwise described above, with an appropriate field generator in the earphone, may be soft when not in use, and harden to fit the user's ear every time the earphone is used. This avoids the problem of a one-time cure product being accidentally fit wrong the first time, and of the user's ear changing over time.

Repeatable Customization

In other examples, a material that is both photo-curable and photo-cleavable is used. Covalent crosslinks are created when exposed to a first wavelength, hardening the material. The crosslinks are cleaved at another wavelength, restoring the compliance of the material. This can be repeated numerous times. Such a material allows reversion of the ear tip back into its original, deformable state in the event that the user wants to re-fit the ear tip. Such need may arise if the user makes a mistake on the first impression, wants to share the earphones with another person, or finds that the fit has changed over time and wants to reset it. Similarly to the examples above, the light source may be a permanent component of the earphone, activated on-demand to reset the ear tip, or it may be separate from the earphone and inserted to the ear tip when needed. The two wavelengths may be emitted by separate light sources, such as separate LEDs that emit the respective wavelengths, or by a compound source that selectively emits light of either wavelength. Such a compound source is typically composed of separate LED devices, which emit different wavelengths, in a single device package. A compound source may also be used in the sensing or user interface dual-use scenarios mentioned above, e.g., a UV wavelength may be used for curing, while an infrared or visible wavelength may be used for sensing.

In another example, similar repeatability can be achieved using a polymer that can be melted by the application of current, such as by Joule heating, and solidified when current is removed. The earphone then provides electrical current, rather than optical energy, to the ear tip during the fitting process. One suitable product is Neaflex deformable plastics from LOMA Innovation S.A.S, located in Paris, France, described in International Patent Publication WO 2017/005658. As with photo-curable materials, the source of the electrical current may be the earphone itself, or it may be a separate part used only when fitting and re-fitting is to be performed.

In other examples, the material used in the ear tip is mechanically curable. For example, a high-consistency rubber is initially deformable. The rubber is compounded with shear-sensitive microspheres containing accelerators and crosslinkers. When the user kneads the ear tip before inserting it, the microspheres are broken, activating the accelerators and crosslinkers to cure the rubber into the shape it assumes when inserted to the ear.

Figure 7:
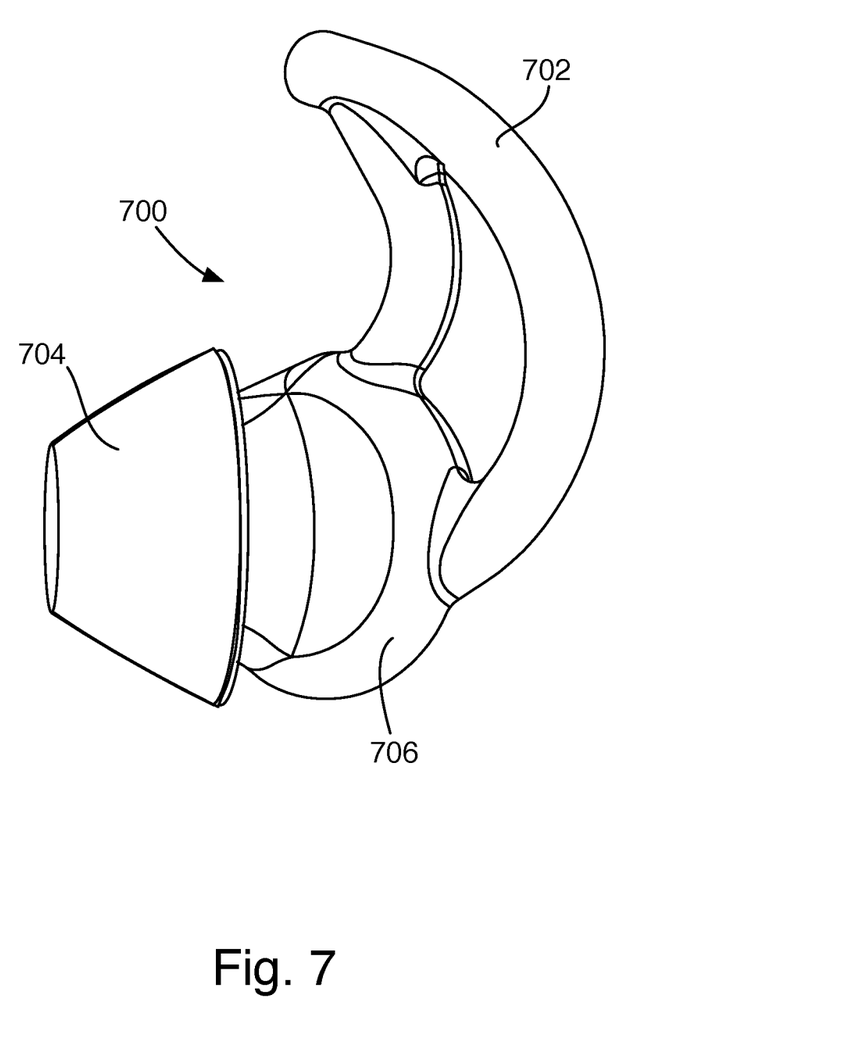
FIG. 7 shows an external view of an ear tip.
Figure 8:
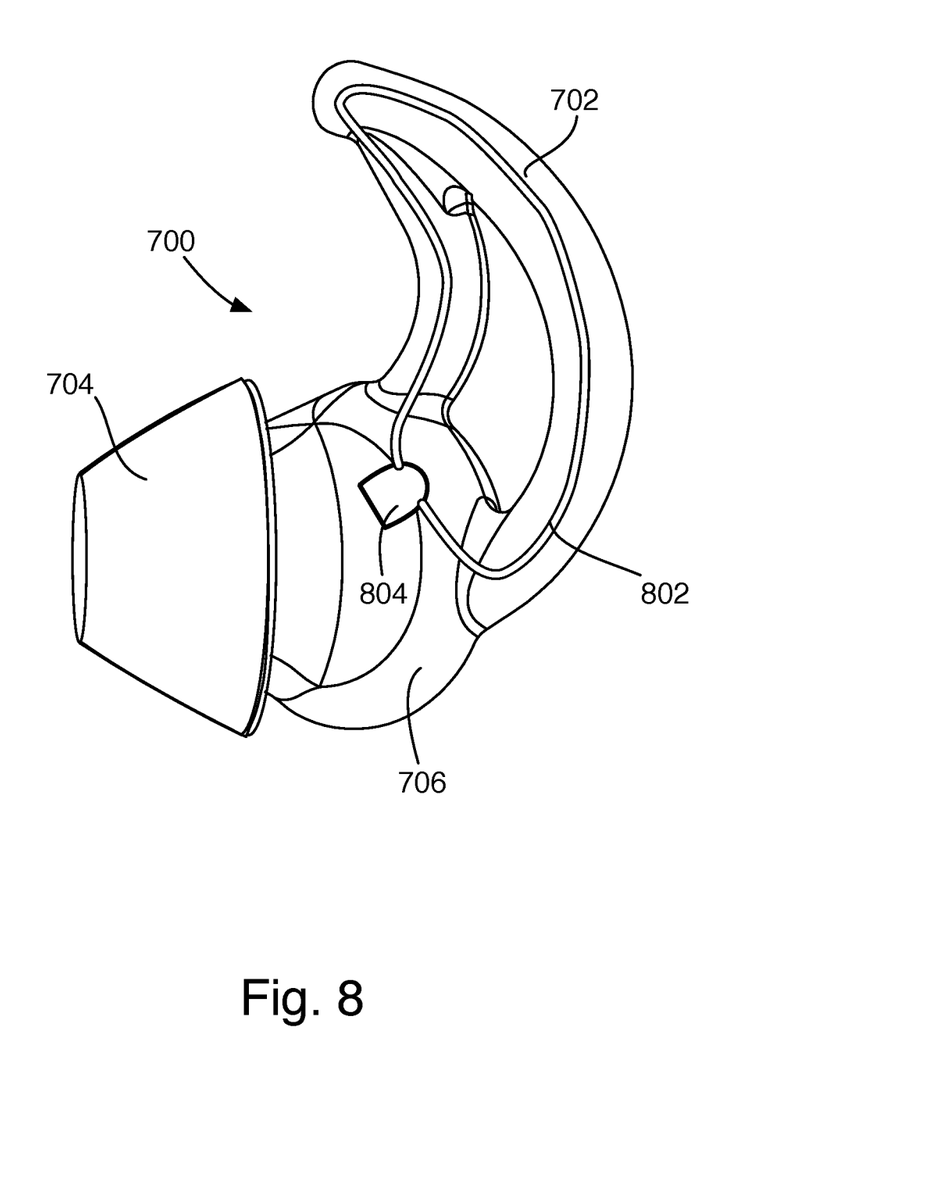
FIG. 8 shows a schematic view of a light source and light guide embedded in the ear tip of FIG. 7.
Figure 9:
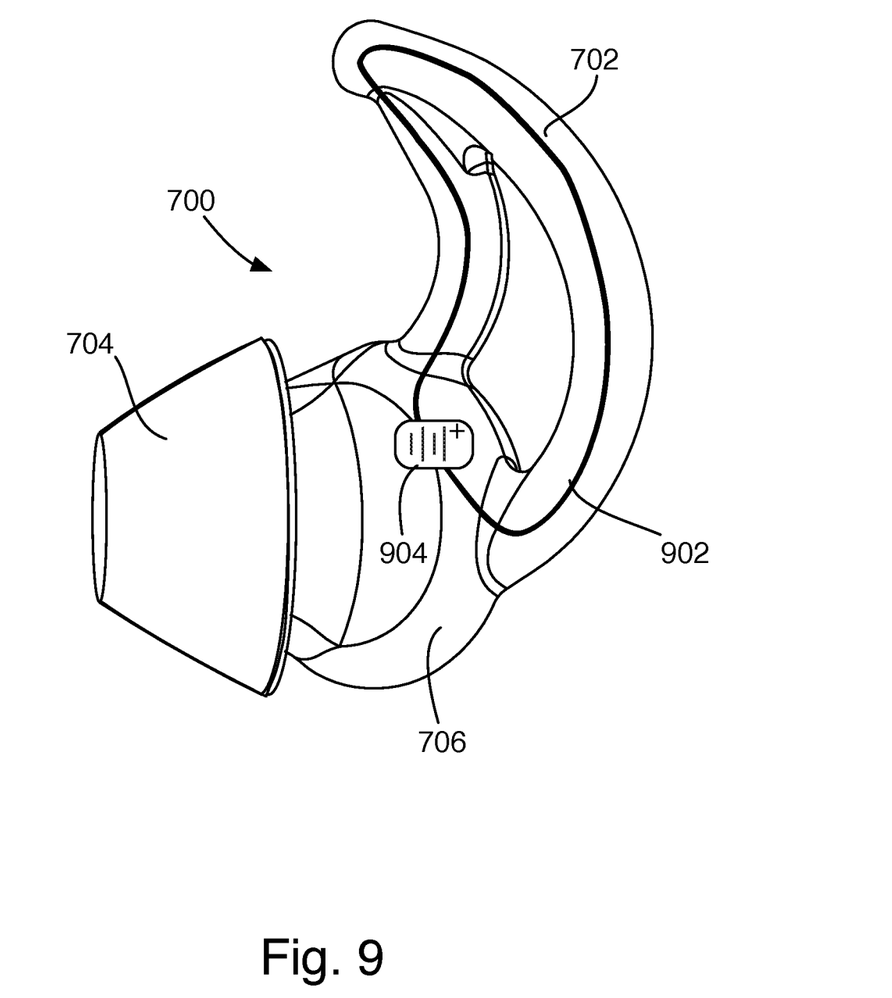
FIG. 9 shows a schematic view of a voltage source and conductor embedded in the ear tip of FIG. 7.

In addition to the area that directly interfaces the ear canal, other parts of the ear tip may also benefit from being selectively made deformable and stiff. In particular, as shown in FIG. 7, some ear tips 700 include a retaining member 702 that conforms to the antihelix of the user's ear. Such members retain the earphone in the ear and can apply pressure opposite the ear canal, to maintain contact pressure on the portion 704 of the ear tip that does interface with the ear canal. See, for example, U.S. Pat. Nos. 8,249,287 and 8,737,669, the entire contents of which are incorporated by reference. In those patents, the retaining structure 702 is made of a silicone material that is stiff enough to retain the earphone in the ear, but flexible enough to conform to individual user's unique anatomy. Forming the retaining member instead from the materials described above can allow the retaining member to be custom-fit to a given ear, while in the soft state, and then cured or solidified to more-stiffly retain the earphone in the hard state. The hardness would be less objectionable than for a universal-fit shape, as it will match the shape of the individual user's ear. For a photo-curable material, the light may be provided through a fiber optic filament 802 through the retaining structure 702, which releases its light along its entire length, coupled to a light source 804 in the earphone or in a temporary source, as shown in FIG. 8. For material using Joule melting, a wire 902 may be embedded in the retaining structure 702 and current supplied form a power source 904, as shown in FIG. 9. Similarly to the light source 804, the power source could be part of the earphone, such as an electrical contact powered by the earphone's battery, or it could be externally applied when needed. In either case, the retaining member may be a single leg, rather than the two-legged structure shown, or one of the two legs may include an opening allowing more control over placement when flexible. The retaining member 702 may also be connected to the body 706 by a hinge, as described in U.S. Patent application publication 2016/0073186, the entire contents of which are incorporated here by reference.

Figure 10:
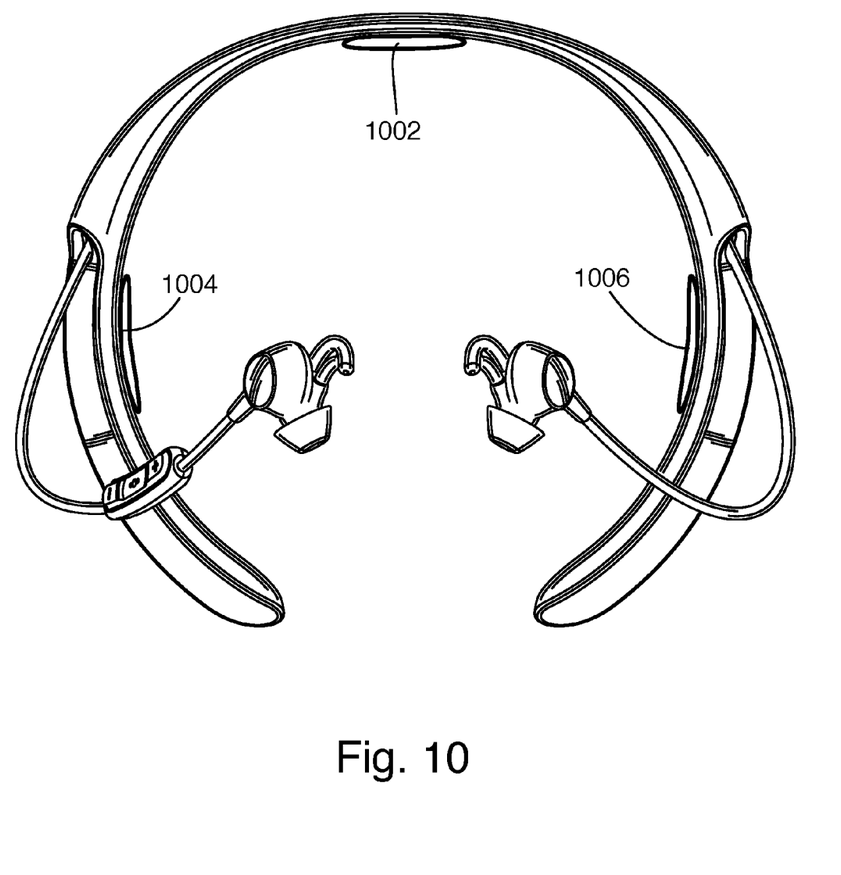
FIG. 10 shows a set of earphones.
Figure 11:
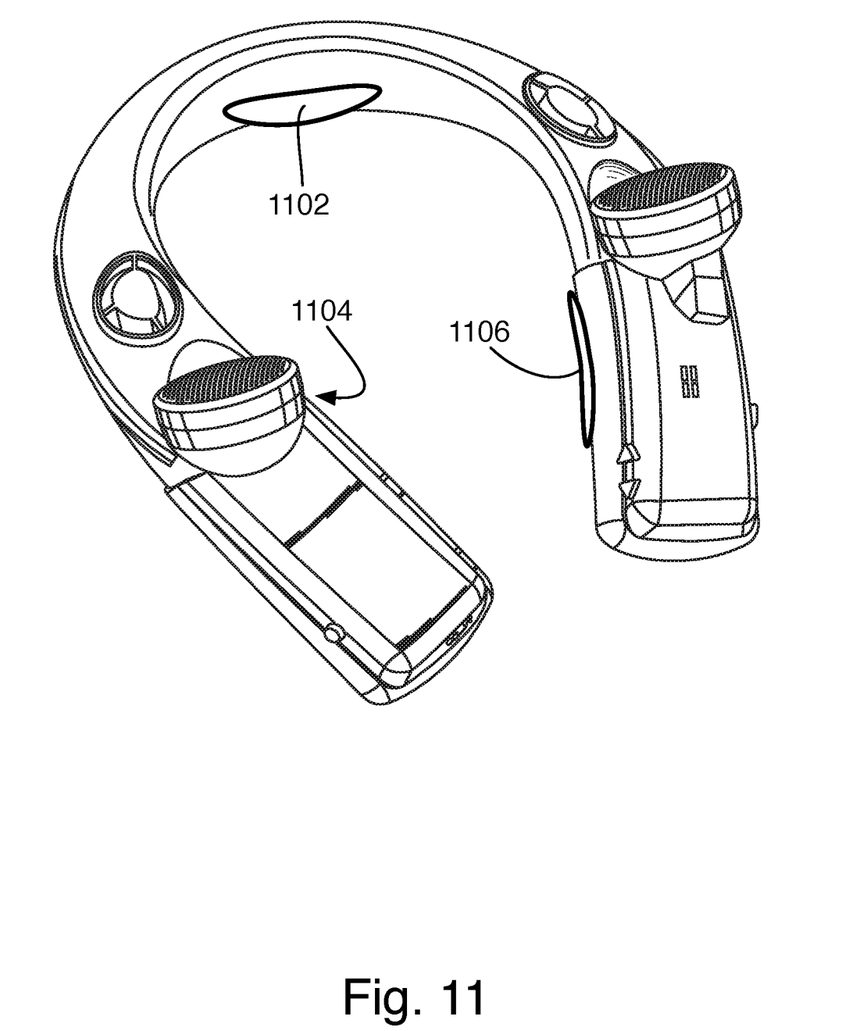
FIG. 11 shows a body-worn loud speaker.

Yet another area where repeatably-customizable materials may have benefit is in neck bands. A recent trend in headphones has been to locate the supporting electronics in an enclosure that is worn around the neck and rests on the user's collarbone, rather than hanging from the ears. Smaller earbuds can then be used, connected to the neck band by wires. An example is the Quiet Control 30 headphones from Bose Corporation, shown in FIG. 10. A related product type places speakers in the neckband, as shown in FIG. 11, for playing audio out loud to be heard by the wearer, as described in U.S. Pat. No. 9,571,917, the entire contents of which are incorporated here by reference. In both product types, the parts of the neckband that contact the body may be uncomfortable if not contoured to match a given user's anatomy, in particular at the collar bone and spine. Pads 1002, 1004, 1006, and 1102, 1004, 1006 of repeatably-deformable material may be used at those locations, softened when the neck band is first fit, or on every use, and then hardening to match the user's unique bone structure, in the same manner as described above.

A number of implementations have been described. Nevertheless, it will be understood that additional modifications may be made without departing from the scope of the inventive concepts described herein, and, accordingly, other embodiments are within the scope of the following claims.

What is claimed is:
1. An apparatus comprising:
an earphone ear tip comprising:
an inner wall forming a hollow passage;
an outer wall joined to the inner wall at a first end and spaced apart from the inner wall along a length between the first end and a second end to define a volume,
the outer wall formed of a compliant material and shaped to fit into a portion of a typical human outer ear or ear canal;
an end wall closing an otherwise-open space between the inner wall and the outer wall at the second end, the end wall closing the volume; and
a compliant material located in the volume between the inner wall, outer wall, and end wall;
an earphone configured to mate with the ear tip, the earphone comprising:
a light source that when activated causes the compliant material to harden; and
a sensor positioned to detect light emitted by the light source and reflected by skin adjacent to the ear tip when the ear tip is located in an ear;
wherein the light source emits ultra violet (UV) light and selectively emits a second wavelength of light other than UV, and
the sensor detects light of the second wavelength.

2. The apparatus of claim 1, wherein the light source is directly coupled to the inner wall of the ear tip.

3. The apparatus of claim 1, wherein the light source is coupled to the polymer by a fiber-optic cable.

4. The apparatus of claim 1, wherein the earphone further comprises audio electronics acoustically coupled to the hollow passage.

5. The apparatus of claim 1, wherein the earphone fits within the hollow passage.

6. The apparatus of claim 1, wherein the outer wall is shaped to close the entrance to a user's ear canal without protruding into the ear canal.

7. The apparatus of claim 1, wherein the compliant material comprises UV-curable silicone.

8. The apparatus of claim 1, wherein the outer wall comprises a material that blocks the transmission of UV light.

9. An apparatus comprising:
an earphone ear tip comprising:
an inner wall forming a hollow passage;

an outer wall joined to the inner wall at a first end and spaced apart from the inner wall along a length between the first end and a second end to define a volume, the outer wall formed of a compliant material and shaped to fit into a portion of a typical human outer ear or ear canal;

an end wall closing an otherwise-open space between the inner wall and the outer wall at the second end, the end wall closing the volume; and a compliant material located in the volume between the inner wall, outer wall, and end wall;

an earphone configured to mate with the ear tip, the earphone comprising:

a light source that when activated causes the compliant material to harden; and a sensor positioned to detect light emitted by the light source and reflected by skin adjacent to the ear tip when the ear tip is located in an ear;

wherein the light source comprises a first LED that emits UV light and a second LED that emits light of the second wavelength.

10. The apparatus of claim 9, wherein the sensor detects light of the second wavelength.

11. An apparatus comprising:
an earphone ear tip comprising:
an inner wall forming a hollow passage;
an outer wall joined to the inner wall at a first end and spaced apart from the inner wall along a length between the first end and a second end to define a volume, the outer wall formed of a compliant material and shaped to fit into a portion of a typical human outer ear or ear canal;

an end wall closing an otherwise-open space between the inner wall and the outer wall at the second end, the end wall closing the volume; and a variable-stiffness material located in the volume between the inner wall, outer wall, and end wall; and a source of energy that can selectively and repeatably cause the variable-stiffness material to become soft or hard;

wherein the variable-stiffness material comprises a photo-reactive material, and the source of energy comprises a light source that emits light of a first wavelength that causes the photo-reactive material to harden, and emits light of a second wavelength that causes the photo-reactive material to become compliant.

12. The apparatus of claim 11, where the light source comprises a first LED that emits light of the first wavelength and a second LED that emits light of the second wavelength.

13. An apparatus comprising:
an earphone ear tip comprising:
an inner wall forming a hollow passage;
an outer wall joined to the inner wall at a first end and spaced apart from the inner wall along a length between the first end and a second end to define a volume, the outer wall formed of a compliant material and shaped to fit into a portion of a typical human outer ear or ear canal;

an end wall closing an otherwise-open space between the inner wall and the outer wall at the second end, the end wall closing the volume; and a variable-stiffness material located in the volume between the inner wall, outer wall, and end wall; and a source of energy that can selectively and repeatably cause the variable-stiffness material to become soft or hard;

wherein the variable-stiffness material softens when current is applied and hardens when current is removed, and the source of energy comprises a source of current.

14. The apparatus of claim 13, wherein the current causes Joule heating of the variable-stiffness material.

15. An apparatus comprising:
an earphone ear tip comprising:
an inner wall forming a hollow passage;
an outer wall joined to the inner wall at a first end and spaced apart from the inner wall by an increasing distance along a length between the first end and a second end to define a generally cone-shaped volume, the outer wall formed of a compliant material and shaped to fit into an entrance of a typical human ear canal;

an end wall closing an otherwise-open space between the inner wall and the outer wall at the second end, the end wall closing the volume; and a variable-stiffness material located in the volume between the inner wall, outer wall, and end wall; and a first source of applied energy that when activated causes the compliant material to change between a compliant state and a stiff state;

wherein:
the first source of applied energy causes the variable-stiffness material to become stiff;
the apparatus further comprising a second source of applied energy that when activated causes the variable-stiffness material to return to its compliant state.

16. The apparatus of claim 15, wherein the variable-stiffness material comprises a photo-reactive material, and
the first source of energy comprises a light source that emits light of a first wavelength that causes the photo-reactive material to become stiff, and emits light of a second wavelength that causes the photo-reactive material to become compliant.

17. An apparatus comprising:
an earphone ear tip comprising:
an inner wall forming a hollow passage;
an outer wall joined to the inner wall at a first end and spaced apart from the inner wall by an increasing distance along a length between the first end and a second end to define a generally cone-shaped volume, the outer wall formed of a compliant material and shaped to fit into an entrance of a typical human ear canal;

an end wall closing an otherwise-open space between the inner wall and the outer wall at the second end, the end wall closing the volume; and a variable-stiffness material located in the volume between the inner wall, outer wall, and end wall; and a first source of applied energy that when activated causes the compliant material to change between a compliant state and a stiff state;

wherein:
when the first source of applied energy is activated, the variable-stiffness material becomes compliant, and
when the first source of applied energy is deactivated, the variable-stiffness material returns to a stiff state.

18. An apparatus comprising:
an earphone ear tip comprising a positioning and retaining structure for positioning and retaining the earphone in the outer ear of a wearer;
the positioning and retaining structure comprising a variable-stiffness material; and a source of energy that can selectively and repeatably cause the variable-stiffness material to become soft or hard;

wherein the variable-stiffness material comprises a photo-reactive material, and the source of energy comprises:

a light source that emits light of a first wavelength that causes the photo-reactive material to harden, and emits light of a second wavelength that causes the photo-reactive material to become compliant, and a light-conductive pathway that conducts the light emitted by the source and releases it into the positioning and retaining structure along its length.

19. An apparatus comprising:

an earphone ear tip comprising a positioning and retaining structure for positioning and retaining the earphone in the outer ear of a wearer;

the positioning and retaining structure comprising a variable-stiffness material; and a source of energy that can selectively and repeatably cause the variable-stiffness material to become soft or hard;

wherein the variable-stiffness material softens when current is applied and hardens when current is removed, and the source of energy comprises:
a source of current, and
a conductor that routes the current along a length of the positioning and retaining structure.

20. The apparatus of claim 19, wherein the current in the conductor causes Joule heating of the variable-stiffness material.

* * * * *